(12) United States Patent
Suzuki et al.

(10) Patent No.: US 12,139,225 B2
(45) Date of Patent: Nov. 12, 2024

(54) MOTORCYCLE SEAT RAIL AND METHOD OF MANUFACTURING THE SAME

(71) Applicant: SUZUKI MOTOR CORPORATION, Hamamatsu (JP)

(72) Inventors: Kenta Suzuki, Hamamatsu (JP); Daisuke Hatano, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 506 days.

(21) Appl. No.: 17/501,583

(22) Filed: Oct. 14, 2021

(65) Prior Publication Data

US 2022/0126940 A1    Apr. 28, 2022

(30) Foreign Application Priority Data

Oct. 28, 2020    (JP) ................................. 2020-180678

(51) Int. Cl.
| | |
|---|---|
| *B62J 1/08* | (2006.01) |
| *B29C 70/70* | (2006.01) |
| *B29K 23/00* | (2006.01) |
| *B29K 77/00* | (2006.01) |
| *B29K 105/08* | (2006.01) |
| *B29L 31/00* | (2006.01) |
| *B29L 31/30* | (2006.01) |

(52) U.S. Cl.
CPC ................. *B62J 1/08* (2013.01); *B29C 70/70* (2013.01); *B29K 2023/12* (2013.01); *B29K 2077/00* (2013.01); *B29K 2105/0872* (2013.01); *B29L 2031/30* (2013.01); *B29L 2031/771* (2013.01)

(58) Field of Classification Search
CPC .... B62J 1/08; B29C 70/70; B29K 2105/0872; B29L 2031/30; B29L 2031/771
See application file for complete search history.

(56) References Cited

U.S. PATENT DOCUMENTS

| | | | |
|---|---|---|---|
| 9,902,458 B2 | 2/2018 | Matsushima | |
| 2016/0200387 A1* | 7/2016 | Matsushima | .......... B62K 11/04 180/219 |
| 2020/0247082 A1* | 8/2020 | Hatano | .................... B32B 5/12 |

FOREIGN PATENT DOCUMENTS

| | | | | |
|---|---|---|---|---|
| CN | 106521718 A | * | 3/2017 | ........... C04B 35/524 |
| GB | 2532936 A | * | 6/2016 | ........... B29C 53/387 |
| JP | 2018199405 A | * | 12/2018 | ............... B62J 1/08 |
| JP | 2020124837 A | | 8/2020 | |

(Continued)

OTHER PUBLICATIONS

Office Action issued in counterpart JP Application No. 2020-180678 dated Aug. 9, 2024. (including computer English translation).

*Primary Examiner* — Jacob D Knutson

(74) *Attorney, Agent, or Firm* — TROUTMAN PEPPER HAMILTON SANDERS LLP

(57) ABSTRACT

A seat rail installed on a vehicle body of a motorcycle. The seat rail includes a lateral member located on a lateral side in a width direction of the vehicle body, the lateral member has a laminated structure in which a sheet material including one layer made of a fiber reinforced resin or a plurality of layers made of a fiber reinforced resin and laminated to each other is folded back and doubly overlapped, and a folded edge part formed by folding back the sheet material is located at a lower edge part of the lateral member. The present invention also relates to a method of manufacturing such a seat rail.

9 Claims, 6 Drawing Sheets

(56) References Cited

FOREIGN PATENT DOCUMENTS

JP          2020172163  A    10/2020
WO         2015/033425  A1    3/2015

* cited by examiner

MOTORCYCLE SEAT RAIL AND METHOD OF MANUFACTURING THE SAME

CROSS REFERENCE TO RELATED APPLICATION

The present application claims priority of Japanese Patent Application No. 2020-180678 filed Oct. 28, 2020. The entire contents of which are hereby incorporated by reference.

TECHNICAL FIELD

The present invention relates to a motorcycle seat rail installed on a vehicle body of a motorcycle. In addition, the present invention relates to a method of manufacturing such a motorcycle seat rail.

BACKGROUND

A seat rail installed on a motorcycle may support a seat, a fuel tank, and the like. Such a seat rail is required to have increased strength in order to support the seat, the fuel tank, and the like. In order to satisfy such requirements, various motorcycle seat rails have been proposed.

An example of such a motorcycle seat rail is a rear frame (seat rail) formed of a fiber reinforced resin, the rear frame including left and right lateral walls, an upper cross member that is formed separately from the left and right lateral walls and is configured to couple upper edge protrusions of the left and right lateral walls and a lower cross member that is formed separately from the left and right lateral walls and is configured to couple lower edge protrusions of the left and right lateral walls (for example, see WO 2015/033425 A1).

SUMMARY

Here, the seat rail may adopt a laminated structure in which a plurality of layers made of a fiber reinforced resin are laminated. In the above-described example of the motorcycle seat rail, when such a laminated structure is adopted for lateral walls, the lateral walls are produced by forming a sheet material having a laminated structure, in which a plurality of layers made of a fiber reinforced resin are laminated, into a desired shape by press forming. However, at edges of such lateral walls, end faces of the plurality of layers made of the fiber reinforced resin are exposed to the outside. Therefore, fibers in the fiber reinforced resin may protrude from the end faces of the plurality of layers in a fluffy manner, and the fibers on such end faces may deteriorate the appearance of the seat rail. In other words, appearance performance of the seat rail may be degraded.

In the seat rail described above, in particular, when a load is applied to a rear part of the seat rail by an occupant, luggage, and the like due to traveling of a motorcycle on a rough road, stress concentration occurs in lower edges of the lateral walls due to the load, and thus, at the lower edges of the lateral walls, "delamination" may occur in which laminated adjacent layers which have been joined together are separated from each other. As a result, strength of the seat rail may decrease.

In view of these circumstances, the motorcycle seat rail and the method of manufacturing the same are preferably configured such that deterioration of the appearance performance of the seat rail can be prevented and the reduction in strength of the seat rail can be prevented.

In order to solve the problems, a motorcycle seat rail according to an aspect is a motorcycle seat rail installed on a vehicle body of a motorcycle, the motorcycle seat rail including: a lateral member located on a lateral side in a width direction of the vehicle body, wherein the lateral member has a laminated structure in which a sheet material including one layer made of a fiber reinforced resin or a plurality of layers made of a fiber reinforced resin and laminated to each other is folded back and doubly overlapped, and a folded edge part formed by folding back the sheet material is located at a lower edge part of the lateral member.

In order to solve the problems, a method of manufacturing a motorcycle seat rail according to an aspect is a method of manufacturing a motorcycle seat rail for manufacturing a seat rail including a lateral member located on a lateral side in a width direction of a vehicle body, the method including: a step of preparing a sheet material including one layer made of a fiber reinforced resin or a plurality of layers made of a fiber reinforced resin and laminated to each other; a step of forming a laminated structure constituting the lateral member in such a manner that the sheet material is folded back and doubly overlapped; and a step of forming an upper flange of the lateral member in such a manner that a facing edge part of the laminated structure facing a folded edge part is bent, the folded edge part being formed by folding back the sheet material and located at a lower edge part of the lateral member.

In a motorcycle seat rail and a method of manufacturing the same, it is possible to prevent deterioration of the appearance performance of the seat rail and to prevent a reduction in strength of the seat rail.

DETAILED DESCRIPTION

A motorcycle seat rail according to an embodiment will be described together with a motorcycle in which the seat rail is installed. Here, the motorcycle in which the seat rail (hereinafter, simply referred to as a "seat rail" as necessary) for the motorcycle is installed includes typically one front wheel and one rear wheel. However, the motorcycle may include two front wheels and one rear wheel.

In FIGS. 1 to 4 of the present embodiment, a front of a vehicle body 1 of the motorcycle (hereinafter, simply referred to as a "front" as necessary) is indicated by a one-headed arrow F, and a rear of the vehicle body 1 (hereinafter, simply referred to as a "rear" as necessary) is indicated by a one-headed arrow R. Therefore, a front-rear direction of the vehicle body 1 (hereinafter, simply referred to as a "front-rear direction" as necessary) is indicated by the one-headed arrow F and the one-headed arrow R. In FIGS. 2 to 6, a width direction of the vehicle body 1 (hereinafter, simply referred to as a "width direction" as necessary) is indicated by a two-headed arrow W. In FIGS. 1, 2, and 4 to 6, an upper side of the vehicle body 1 (hereinafter, simply referred to as an "upper side" as necessary) is indicated by a one-headed arrow U, and a lower side of the vehicle body 1 (hereinafter, simply referred to as a "lower side" as necessary) is indicated by a one-headed arrow D. An up-down direction of the vehicle body 1 (hereinafter, simply referred to as an "up-down direction" as necessary) is indicated by the one-headed arrow U and the one-headed arrow D.

Figure 1:
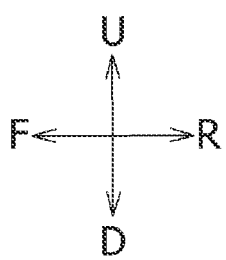
FIG. 1 is a side view schematically showing a motorcycle including a seat rail according to an embodiment.
Figure 1:
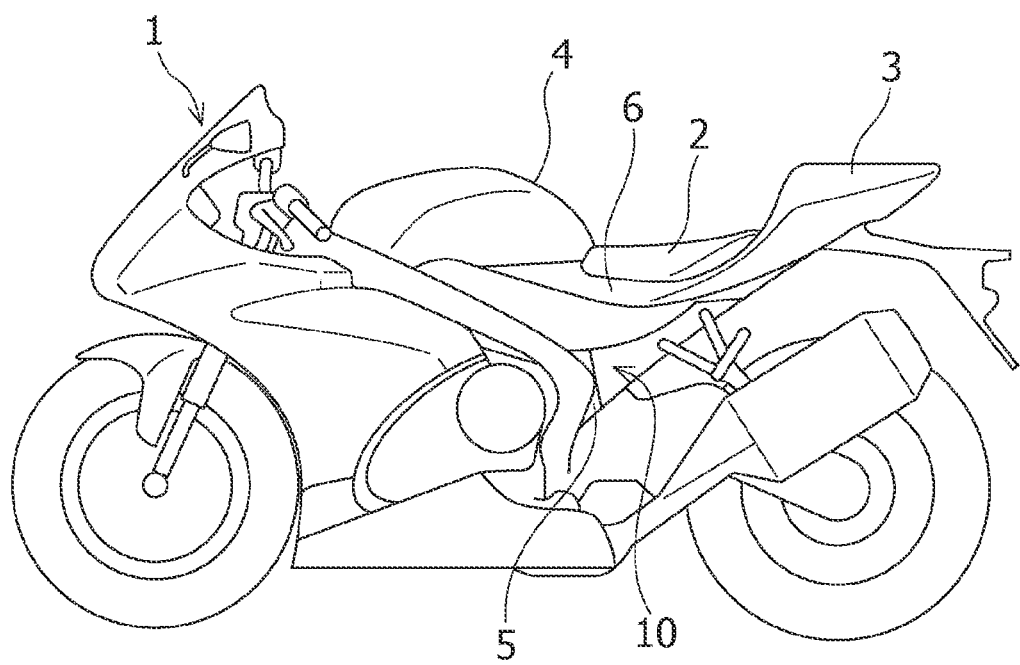

An outline of a seat rail 10 and the motorcycle according to the present embodiment will be described with reference to FIGS. 1 to 6. In other words, the seat rail 10 and the motorcycle are generally configured as follows. As shown in FIG. 1, the seat rail 10 is installed on a vehicle body 1 of the motorcycle.

As shown in FIGS. 2 to 6, the seat rail 10 includes a lateral member 20 located at a lateral side in the width direction of the vehicle body 1. Specifically, the seat rail 10 includes two lateral members 20 located at both lateral sides of the vehicle body 1 in the width direction. The two lateral members 20 are spaced apart from each other in the width direction.

Here, the seat rail 10 according to the present embodiment is configured such that both of the two lateral members 20 include components which will be described in detail below. The components of the two lateral members 20 are substantially symmetrical in the width direction. However, the seat rail may be configured such that only one of the two lateral members 20 includes the following components. Based on these considerations, in the following, unless the two lateral members 20 and the components related to the two lateral members 20 are specifically described, it is assumed that the components in one of the two lateral members 20 are representatively described.

Figure 2:
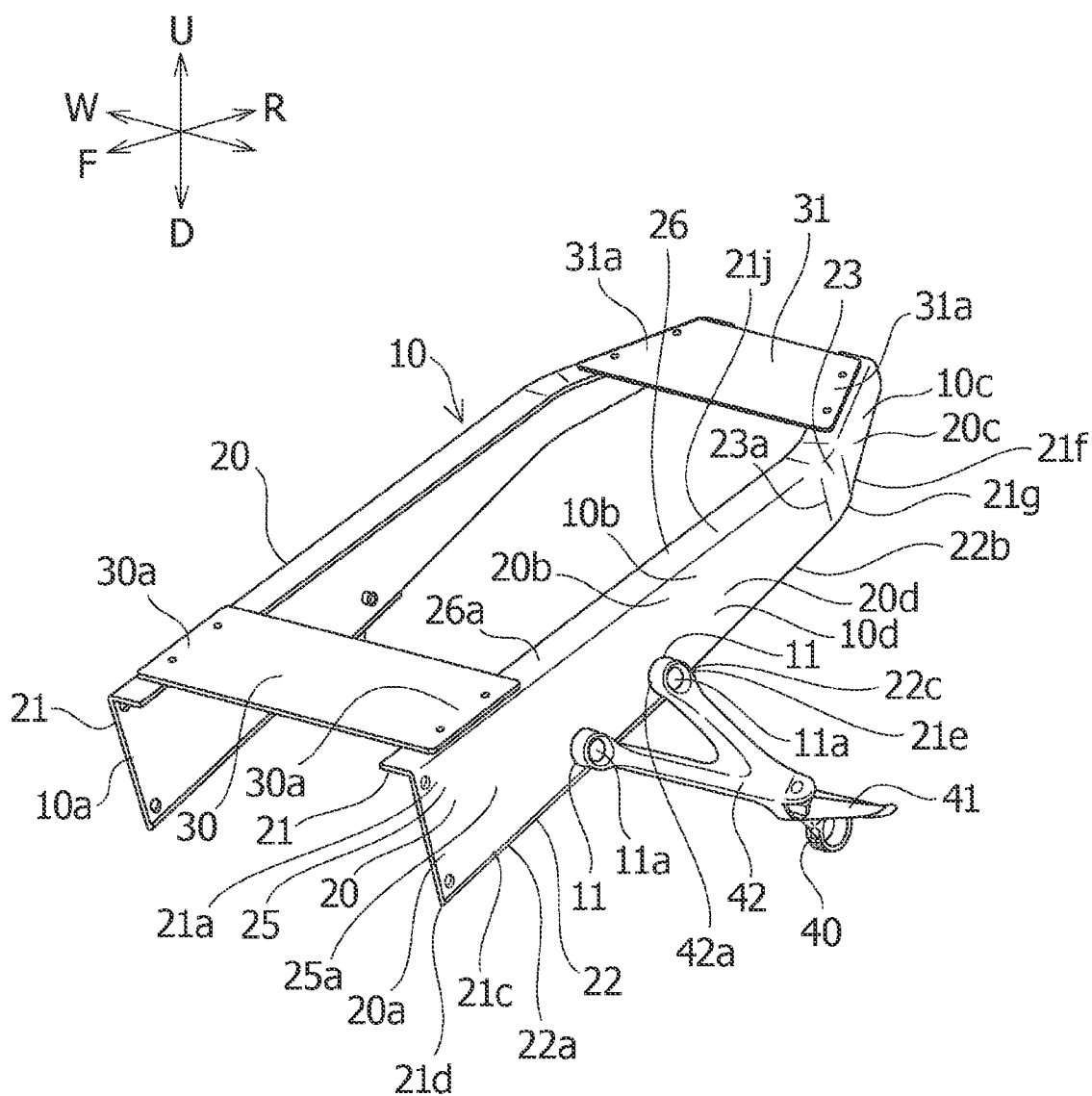
FIG. 2 is a perspective view schematically showing the seat rail according to the embodiment together with a footrest attached to the seat rail.
Figure 4:
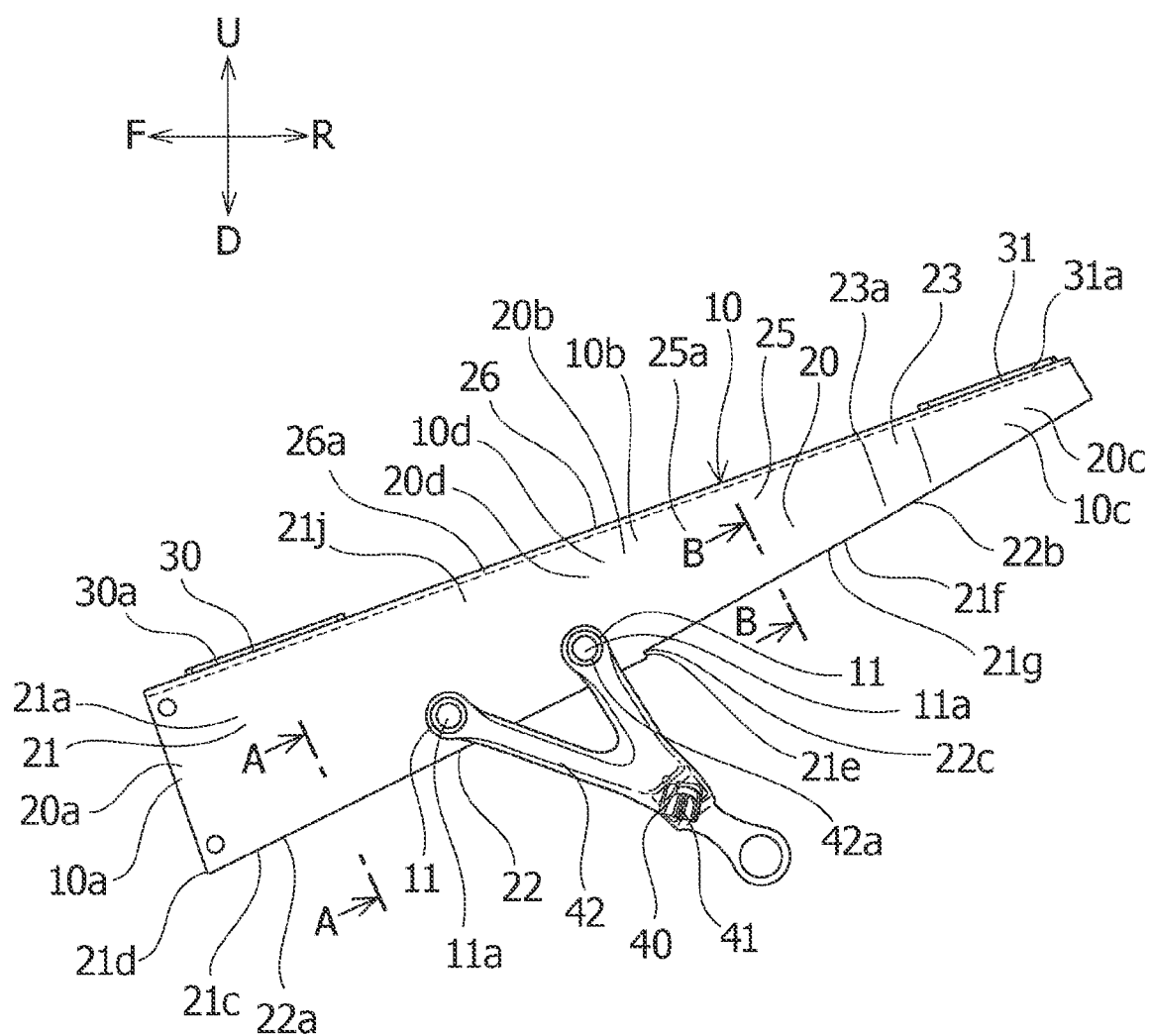
FIG. 4 is a side view schematically showing the seat rail according to the embodiment together with the footrest attached to the seat rail.
Figure 5:
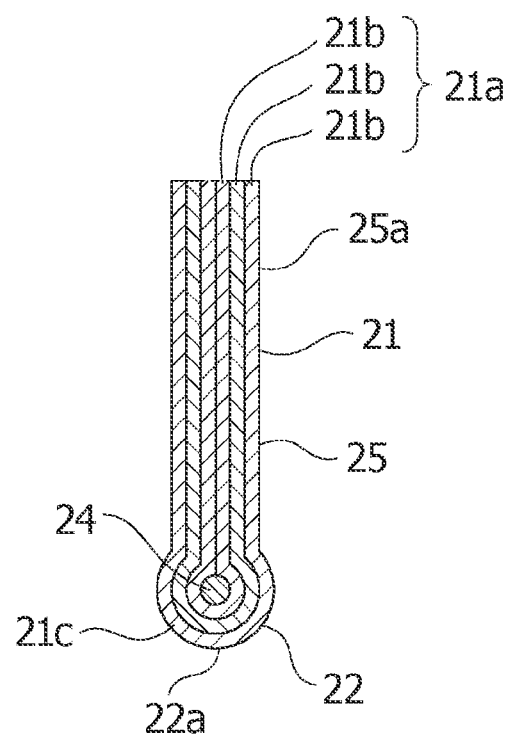
FIG. 5 is a cross-sectional view taken along a line A-A in FIG. 4.

As shown in FIG. 5, each of the lateral members 20 has a laminated structure 21 in which a sheet material 21a including a plurality of layers 21b made of a fiber reinforced resin and laminated to each other is folded back and doubly overlapped. However, the sheet material 21a can also be configured to include one layer 21b made of a fiber reinforced resin. The laminated structure 21 includes a folded edge part 21c formed by folding back the sheet material 21a. Referring to FIGS. 2, 4, and 5, the folded edge part 21c is disposed at a lower edge part 22 of the lateral member 20.

Figure 3:
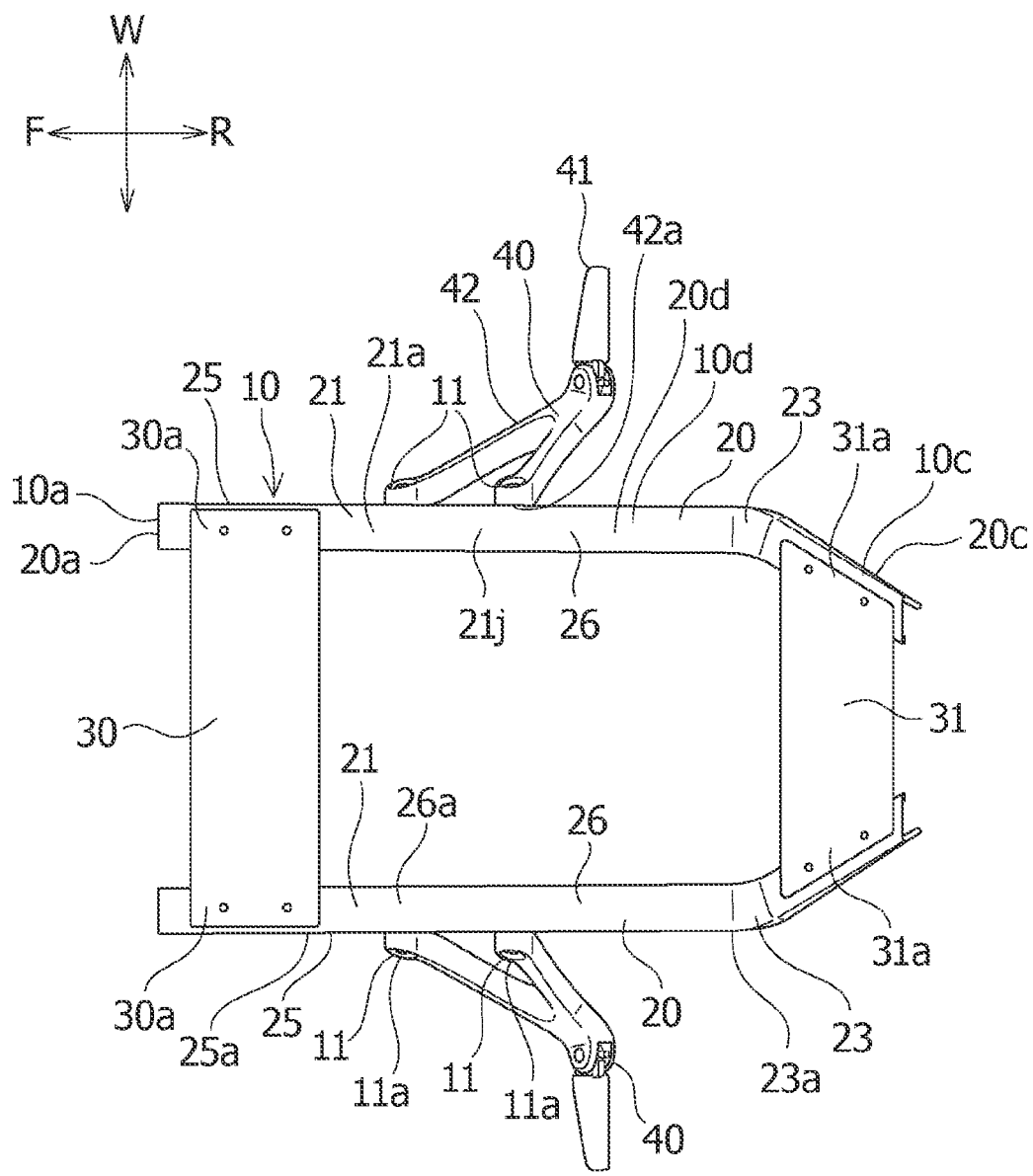
FIG. 3 is a plan view schematically showing the seat rail according to the embodiment together with the footrest attached to the seat rail.

Furthermore, the seat rail 10 and the motorcycle according to the present embodiment can be generally configured as follows. As shown in FIGS. 2 to 4, the seat rail 10 includes a coupling member 30 that couples the two lateral members 20 spaced apart from each other in the width direction. Each of the lateral members 20 includes a curved region 23 that is curved so as to be located closer to a center in the width direction of the vehicle body as going toward a rear from a front of the vehicle body. The lower edge part 22 of each of the lateral members 20 includes a front area 22a and a rear area 22b located closer to the rear of the vehicle body 1 with respect to the front area 22a.

As shown in FIGS. 2 and 4, the folded edge part 21c of the laminated structure 21 used for each of the lateral members 20 forms the front area 22a of the lower edge part 22 of the lateral member 20. An inflection area 22c is formed between the front and rear areas 22a and 22b of the lower edge part 22 of the lateral member 20 such that the rear area 22b of the lower edge part 22 of each of the lateral members 20 is located upward from the front toward the rear of the vehicle body. When the vehicle body 1 is viewed in the width direction, the inflection area 22c of each of the lateral members 20 is disposed in front of a front end 23a of the curved region 23 of the lateral member 20 in the front-rear direction of the vehicle body and behind the coupling member 30.

As shown in FIG. 5, the lateral member 20 includes a core 24 located inside the folded edge part 21c of the laminated structure 21. In the laminated structure 21, the sheet material 21a is folded back along the core 24.

Referring to FIGS. 2 to 4, a footrest assembly 40 including a footrest main body 41 and a footrest bracket 42 is attached to each of the lateral members 20. The vehicle body 1 of the motorcycle includes two footrest assemblies 40. The footrest brackets 42 of the two footrest assemblies 40 are attached to the two lateral members 20, respectively. The seat rail 10 includes two fastening portions 11 that fasten the lateral member 20 and the footrest bracket 42 attached to the lateral member 20 together. The two fastening portions 11 are spaced apart from each other in the front-rear direction and are disposed between a front end 21d and a rear end 21e of the folded edge part 21c of the lateral member 20 to be fastened by the fastening portions 11.

Referring to FIGS. 1 and 2, the motorcycle according to the present embodiment can be configured in detail as follows. As shown in FIG. 1, the vehicle body 1 of the motorcycle includes a seat 2, a luggage rack 3, and a fuel tank 4. The seat 2 is supported from below by the seat rail 10. Referring to FIGS. 1 and 2, the seat 2 is supported from below by the coupling member 30 of the seat rail 10.

As shown in FIG. 1, the luggage rack 3 is located behind the seat 2. The luggage rack 3 is adjacent to the seat 2 in the front-rear direction. The fuel tank 4 is located in front of the seat 2. The fuel tank 4 is adjacent to the seat 2 in the front-rear direction.

The vehicle body 1 of the motorcycle includes a main frame 5. The main frame 5 is located in front of the seat rail 10, and is located below the fuel tank 4. The main frame 5 is adjacent to the seat rail 10 in the front-rear direction. Referring to FIGS. 1 and 2, a front end part 10a of the seat rail 10 in the front-rear direction is attached to the main frame 5. Specifically, front end parts 20a in the front-rear direction of the two lateral members 20 of the seat rail 10 are attached to the main frame 5.

As shown in FIG. 1, the vehicle body 1 includes an outer panel 6. The outer panel 6 is located below the seat 2. The outer panel 6 is also adjacent to the seat 2 in the up-down direction. The outer panel 6 covers an upper part 10b of the seat rail 10 from both outer sides in the width direction. Specifically, the outer panel 6 covers an upper part 20b of each of the lateral members 20 from an outer side in the width direction. However, the vehicle body may be configured without the outer panel. In that case, the vehicle body may be configured such that the lateral members are exposed to the outside of the vehicle body as exterior members.

Referring to FIGS. 2 to 4, the seat rail 10 according to the present embodiment can be configured in detail as follows. As shown in FIGS. 2 to 4, the seat rail 10 includes an additional coupling member 31 extending to couple the two lateral members 20 to each other, in addition to the coupling member 30 described above. The additional coupling member 31 is located behind the coupling member 30. In the following, as necessary, the coupling member 30 will be referred to as a front coupling member 30, and the additional coupling member 31 will be referred to as a rear coupling member 31. When the seat rail 10 includes a plurality of coupling members, the front coupling member 30 can be located at the frontmost position among the plurality of coupling members. The rear coupling member 31 can be located at the rearmost position among the plurality of coupling members.

The front coupling member 30 is located closer to the front end part 10a of the seat rail 10 in the front-rear direction. The front coupling member 30 supports a front part of the seat 2 in the front-rear direction from below. The rear coupling member 31 is located closer to a rear end part 10c of the seat rail 10 in the front-rear direction. The rear coupling member 31 can be located to correspond to the rear end part 10c of the seat rail 10 in the front-rear direction. The rear coupling member 31 supports a rear part of the seat 2 in the front-rear direction and the luggage rack 3 from below. The front and rear coupling members 30 and 31 are spaced apart from each other in the front-rear direction.

The footrest assembly 40 is configured for a pillion rider. The footrest main body 41 of the footrest assembly 40 is formed to protrude outward in the width direction of the vehicle body 1 from a lower end part of the footrest bracket 42 in the up-down direction. The footrest bracket 42 includes attachment portions 42a configured to attach the footrest bracket 42 to the lateral member 20. The attachment portions 42a are disposed at an upper end part of the footrest bracket 42 in the up-down direction. The attachment portions 42a of the footrest bracket 42 are fastened to the lateral member 20, to which the footrest bracket 42 are attached, by the two fastening portions 11 described above.

As shown in FIGS. 2 and 4, each of the fastening portions 11 includes a fastening member 11a including a male screw part and a head part and a fastened member (not shown) including a female screw part into which the male screw part (not shown) of the fastening member 11a is screwed. Furthermore, each of the fastening portions 11 is configured such that the lateral member 20 and the attachment portion 42a of the footrest bracket 42 are tightened between the head part of the fastening member 11a and the fastened member in a state in which the male screw part of the fastening member 11a is screwed into the female screw part of the fastened member, the male screw part of the fastening member 11a being inserted into a through hole (not shown) formed in the lateral member 20 and the attachment portion 42a of the footrest bracket 42 that are fastened to each other by such a fastening portion. For example, the fastening member 11a may be a bolt, and the fastened member may be a nut. However, a fastening method of the fastening portion is not limited thereto.

Referring to FIGS. 2 to 6, the lateral member 20 can be configured in detail as follows. The fiber reinforced resin used for the lateral member 20 is a continuous fiber reinforced resin or a discontinuous fiber reinforced resin. Such a fiber reinforced resin contains a predetermined resin material and a plurality of fibers.

As the resin material of the fiber reinforced resin, a thermoplastic resin or a thermosetting resin can be used. Examples of the thermoplastic resins may include polyamide, polypropylene, and the like. Examples of the thermosetting resins may include an epoxy resin, a phenol resin, and the like. Examples of the fibers of the fiber reinforced resin may include carbon fiber, glass fiber, polyamide fiber, polyethylene fiber, and the like. When the fiber reinforced resin is the discontinuous fiber reinforced resin, a length of one fiber may preferably be 10 mm or more from the viewpoint of a reinforcement effect. However, the length of one fiber is not limited thereto.

Referring to FIGS. 2 to 4, the lateral member 20 is formed in an elongated shape with a front-rear direction being in a longitudinal direction. The core 24 of the lateral member 20 is formed in a rod shape. The lateral member 20 includes a vertical wall 25 located at a lateral end in the width direction thereof. The vertical wall 25 is also formed in an elongated shape with a front-rear direction being in a longitudinal direction.

The vertical wall 25 of the lateral member 20 includes an outer surface 25a facing outward in the width direction of the vehicle body 1. The attachment portion 42a of the footrest bracket 42 is in contact with the outer surface 25a of the vertical wall 25 of the lateral member 20, and is attached to the vertical wall 25. Although not clearly shown, the attachment portion 42a of the footrest bracket 42 and the vertical wall 25 of the lateral member 20 are formed with through holes through which the fastening member 11a is inserted.

Figure 6:
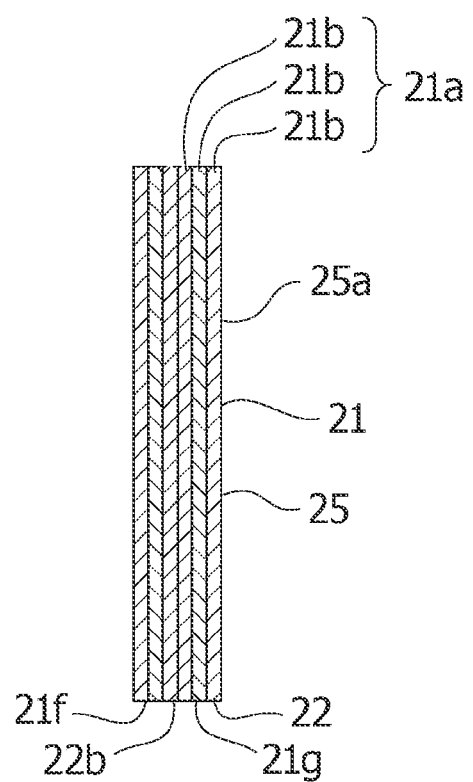
FIG. 6 is a cross-sectional view taken along a line B-B in FIG. 4.

With further reference to FIGS. 2 and 4, a lower edge part 22 of the vertical wall 25 corresponds to a lower edge part 22 of the lateral member 20. The lower edge part 22 is terminated to form a protruding shape from a lower side to an upper side. As shown in FIG. 5, the front area 22a of the lower edge part 22 is configured by the folded edge part 21c of the laminated structure 21 as described above. As shown in FIG. 6, the laminated structure 21 includes a laminated edge part 21f configured to be exposed in a state in which the plurality of layers 21b are laminated. The rear area 22b of the lower edge part 22 is configured by such a laminated edge part 21f.

Referring to FIG. 2 and FIGS. 4 to 6, the front area 22a of the lower edge part 22 is formed to protrude downward with respect to the rear area 22b of the lower edge part 22. The inflection area 22c located between the front and rear areas 22a and 22b of the lower edge part 22 is formed in a stepped shape.

Referring to FIGS. 2 to 4, the lateral member 20 further includes an upper flange 26 that protrudes in the width direction from an upper edge of the vertical wall 25. Specifically, the upper flange 26 protrudes toward the center in the width direction of the vehicle body 1 from the upper edge of the vertical wall 25. The upper flange 26 is formed in an elongated shape with a front-rear direction being in a longitudinal direction.

The upper flange 26 includes an upper surface 26a facing upward. Both end parts 30a and 31a of the front and rear coupling members 30 and 31 in the width direction are in contact with the upper surfaces 26a of the upper flanges 26 of the two lateral members 20, respectively, and are attached to the upper flanges 26, respectively.

The curved region 23 of the lateral member 20 is located between the rear end part 10c of the seat rail 10 and an intermediate part 10d of the seat rail 10 in the front-rear direction. Specifically, the curved region 23 of the lateral member 20 is located between a rear end part 20c of the lateral member 20 in the front-rear direction and an intermediate part 20d of the lateral member 20 in the vehicle front-rear direction.

The curved area 23 is located closer to the rear than the front area 22a of the lower edge part 22, that is, than the folded edge part 21c. In other words, the curved area 23 is located closer to the rear than the inflection area 22c of the lower edge part 22. The rear coupling member 31 is located closer to the rear than the curved area 23.

A method of manufacturing the seat rail 10 according to the present embodiment will be described. In other words, according to the present embodiment, the seat rail 10 including the lateral members 20 located at the lateral sides of the vehicle body 1 in the width direction can be manufactured as follows.

Figure 7:
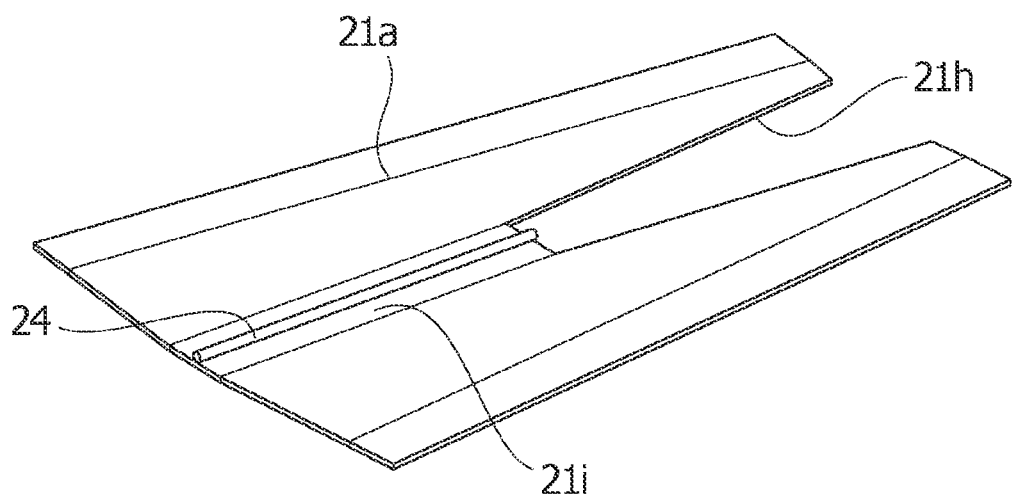
FIG. 7 is a perspective view schematically showing a sheet material and a core used to manufacture lateral members of the seat rail according to the embodiment in a state in which the sheet material is developed.

A method of manufacturing the lateral member 20 of the seat rail 10 will be described. First, a sheet material 21a is prepared which is made of a fiber reinforced resin and includes a plurality of layers 21b laminated to each other (sheet material preparing step). However, the sheet material may be configured to include one layer made of a fiber reinforced resin. As shown in FIG. 7, the sheet material 21a is notched inward from an outer peripheral edge thereof to form a notch part 21h (notching step), whereby a notched edge part 21g of a laminated structure 21, which will be described below, is formed. At this time, the sheet material 21a is formed with a planned folding part 21i adjacent to the notch part 21h in a notch direction.

The core 24 is disposed on the planned folding part 21i. The sheet material 21a is doubly overlapped by folding back along the core 24, and as a result, the laminated structure 21 having the cross sections shown in FIGS. 5 and 6 is formed (laminated structure forming step). However, the sheet material can also be folded back directly without using the core.

The laminated structure 21 is provided with the folded edge part 21c that is formed by folding of the sheet material 21a and is located at the lower edge part 22 of the lateral member 20. A facing edge part 21j (shown in FIGS. 2 to 4) of the laminated structure 21 facing the folded edge part 21c is bent, and as a result, the upper flange 26 of the lateral member 20 is formed (upper flange forming step). At this time, the laminated structure 21 is subjected to press forming. However, the laminated structure may be subjected to forming other than the press forming.

The lateral member 20 of the seat rail 10 can be manufactured by the manufacturing method including these steps. The front area 22a of the lower edge part 22 of the lateral member 20 is formed by the folded edge part 21c, and the rear area 22b of the lower edge part 22 of the lateral member 20 is formed by the notched edge part 21g.

A method of manufacturing the seat rail 10 will be described below. In such a manufacturing method, the lateral member 20, the front coupling member 30, the rear coupling member 31, and the footrest assembly 40 are assembled. First, the attachment portion 42a of the footrest bracket 42 of the footrest assembly 40 is attached to each of the two lateral members 20 (footrest attaching step). In a state in which the two lateral members 20 are disposed to be spaced apart from each other in the width direction, the both end parts 30a and 31a of the front coupling member 30 and the rear coupling member 31 are placed on the upper flanges 26 of the two lateral members 20, and the both end parts 30a and 31a of the front coupling member 30 and the rear coupling member 31 are attached to the upper flanges 26 of the two lateral members 20 (coupling member attaching step). The seat rail 10 can be manufactured by the manufacturing method including these steps.

As described above, the seat rail 10 according to the present embodiment is the seat rail 10 installed on the vehicle body 1, the seat rail 10 including the lateral member 20 located on a lateral side in the width direction of the vehicle body 1, wherein the lateral member 20 has the laminated structure 21 in which the sheet material 21a including one layer 21b made of the fiber reinforced resin or the plurality of layers 21b made of the fiber reinforced resin and laminated to each other are folded back and doubly overlapped, and the folded edge part 21c formed by folding back the sheet material 21a is located at the lower edge part 22 of the lateral member 20.

In general, the seat rail is configured in which the upper part of the lateral member is covered by the outer panel of the vehicle body and the lower part of the lateral member is exposed to the outside. In the seat rail 10 according to the present embodiment, the folded edge part 21c is provided at the lower edge part 22 of the lateral member 20. Therefore, the end faces of the plurality of layers 21b made of the fiber reinforced resin are not exposed to the outside in the folded edge part 21c, and as a result, it is possible to prevent fibers in the fiber reinforced resin protruding from the plurality of layers 21b in a fluffy manner from being exposed to the outside at the lower edge part 22 of the lateral member 20. Accordingly, deterioration of appearance performance of the seat rail 10 can be prevented.

In addition, the end faces of the plurality of layers 21b made of the fiber reinforced resin are not exposed to the outside in the folded edge part 21c, and as a result, it is possible to prevent an occurrence of delamination at the lower edge part 22 of the lateral member 20. Accordingly, it is possible to prevent a reduction in strength of the seat rail 10.

The seat rail 10 according to the present embodiment includes the coupling member 30 that couples the two lateral members 20 spaced apart from each other in the width direction of the vehicle body 1, wherein each of the lateral members 20 includes the curved region 23 that is curved to be located closer to the center in the width direction of the vehicle body 1 as it progresses toward the rear of the vehicle body 1 from the front of the vehicle body 1, the lower edge part 22 of each of the lateral members 20 includes the front area 22a and the rear area 22b located closer to the rear of the vehicle body 1 with respect to the front area 22a, the folded edge part 21c of each of the lateral members 20 forms the front area 22a of the lower edge part 22 of the lateral member 20, the inflection area 22c is formed between the front and rear areas 22a and 22b of the lower edge part 22 of the lateral member 20 such that the rear area 22b of the lower edge part 22 of each of the lateral members 20 is located upward from the front of the vehicle body 1 toward the rear of the vehicle body 1, and when the vehicle body 1 is viewed in the width direction, the inflection area 22c of each of the lateral members 20 is disposed in front of the front end 23a of the curved region 23 of the lateral member 20 in the front-rear direction of the vehicle body 1 and behind the coupling member 30.

In such a seat rail 10, when a weight load is applied to the coupling member 30 by the fuel tank 4, the rider, and the like, a load applied to the front area 22a of the lower edge part 22 of the lateral member 20 by the weight load is greater than a load applied to the rear area 22b of the lower edge part 22 of the lateral member 20 by the weight load. In such circumstances, since the front area 22a of the lower edge part 22 of the lateral member 20 is configured by the folded edge part 21c, it is possible to prevent an occurrence of delamination in the front area 22a of the lower edge part 22 of the lateral member 20 due to such a large load. Accordingly, it is possible to prevent a reduction in strength of the seat rail 10.

The front area 22a, which is configured by the folded edge part 21c, of the lower edge part 22 of the lateral member 20 has greater rigidity than that of the rear area 22b, which is configured by a part other than the folded edge part 21c, of the lower edge part 22 of the lateral member 20, the inflection area 22c is formed between the front and rear areas 22a and 22b, and the rear area 22b includes the curved region 23 located closer to the rear of the vehicle body 1 with respect to the inflection area 22c. The rear area 22b having such low rigidity is easily deformed to include the curved region 23. Therefore, production efficiency of the lateral member 20 can be improved, and thus production efficiency of the seat rail 10 can be improved. Furthermore, the seat rail 10 can be made compact and slim by the curved region 23 of the lateral member 20, and thus the vehicle body 1 can be made compact and slim.

In the seat rail 10 according to the present embodiment, the lateral member 20 includes the core 24 located inside the folded edge part 21c thereof and extending along the folded edge part 21c, and the sheet material 21a is folded back along the core 24 in the laminated structure 21 of the lateral member 20.

In the seat rail 10, a curvature of the folded edge part 21c formed by folding back the sheet material 21a can be made gentle by the core 24, and as a result, the fibers in the fiber reinforced resin can be prevented from breaking in the folded edge part 21c and the surroundings thereof. Furthermore, the folded edge part 21c and the surroundings thereof can be reinforced by the core 24, and stress concentration in the folded edge part 21c and the surroundings thereof can be prevented. Accordingly, it is possible to prevent reduction in strength of the seat rail 10.

In the work of folding back the sheet material 21a to form the folded edge part 21c, the sheet material 21a can be easily folded back along the core 24. Therefore, the production efficiency of the seat rail 10 can be improved.

In the seat rail 10 according to the present embodiment, the two fastening portions 11 are provided to fasten the lateral member 20 and the footrest bracket 42 together, and the two fastening portions 11 are spaced apart from each other in the front-rear direction of the vehicle body 1 and are disposed between the front end 21d and the rear end 21e of the folded edge part 21c of the lateral member 20 to be fastened by the fastening portions.

In the seat rail 10, the footrest bracket 42 subjected to the downward load from the rider, particularly the pillion footrest bracket 42 subjected to the downward load from the pillion rider can be supported by the folded edge part 21c of the lateral member 20 and the surroundings thereof having high rigidity. Therefore, it is possible to sufficiently secure the strength of the seat rail 10 against the load applied downward from the rider through the footrest bracket 42.

Furthermore, the method of manufacturing the seat rail 10 according to the present embodiment is a method of manufacturing the seat rail 10 used to manufacture the seat rail 10 including the lateral member 20 located on a lateral side in the width direction of the vehicle body 1, the method including: a step of preparing the sheet material 21a including one layer 21b made of the fiber reinforced resin or the plurality of layers 21b made of the fiber reinforced resin and laminated to each other; a step of forming the laminated structure 21 constituting the lateral member 20 in such a manner that the sheet material 21a is folded back and doubly overlapped; and a step of forming the upper flange 26 of the lateral member 20 in such a manner that the facing edge part 21j of the laminated structure 21 facing the folded edge part 21c is bent, the folded edge part 21c being formed by folding back the sheet material 21a and located at the lower edge part 22 of the lateral member 20.

In such a manufacturing method, as described above, the end faces of the plurality of layers 21b made of the fiber reinforced resin are not exposed to the outside in the folded edge part 21c, and as a result, it is possible to prevent the fibers in the fiber reinforced resin protruding from the plurality of layers 21b in a fluffy manner from being exposed to the outside at the lower edge part 22 of the lateral member 20. Accordingly, deterioration of appearance performance of the seat rail 10 can be prevented.

In addition, the end faces of the plurality of layers 21b made of the fiber reinforced resin are not exposed to the outside in the folded edge part 21c, and as a result, it is possible to prevent occurrence of delamination at the lower edge part 22 of the lateral member 20. Accordingly, it is possible to prevent reduction in strength of the seat rail 10.

In the method of manufacturing the seat rail 10 according to the present embodiment, the laminated structure 21 includes the notched edge part 21g that is adjacent to the folded edge part 21c in the longitudinal direction thereof and formed by notching the sheet material 21a, and the folded edge part 21c forms the front area 22a of the lower edge part 22 of the lateral member 20, and the notched edge part 21g forms the rear area 22b of the lower edge part 22 of the lateral member 20.

In such a manufacturing method, as described above, since the front area 22a of the lower edge part 22 of the lateral member 20 is configured by the folded edge part 21c, it is possible to prevent occurrence of delamination in the front area 22a of the lower edge part 22 of the lateral member 20 due to the large load described above. Accordingly, it is possible to prevent reduction in strength of the seat rail 10.

The front area 22a, which is configured by the folded edge part 21c, of the lower edge part 22 of the lateral member 20 has greater rigidity than that of the rear area 22b, which is configured by the notched edge part 21g, of the lower edge part 22 of the lateral member 20, the inflection area 22c is formed between the front and rear areas 22a and 22b, and the rear area 22b includes the curved region 23 located closer to the rear of the vehicle body 1 with respect to the inflection area 22c. The rear area 22b having such low rigidity is easily deformed to include the curved region 23. Therefore, production efficiency of the lateral member 20 can be improved, and thus, production efficiency of the seat rail 10 can be improved.

In the method of manufacturing the seat rail 10 according to the present embodiment, the sheet material 21a is folded back along the core 24. Therefore, the curvature of the folded edge part 21c formed by folding back the sheet material 21a can be made gentle by the core 24, and as a result, the fibers in the fiber reinforced resin can be prevented from breaking in the folded edge part 21c and the surroundings thereof. Furthermore, the folded edge part 21c and the surroundings thereof can be reinforced by the core 24, and stress concentration in the folded edge part 21c and the surroundings thereof can be prevented. Accordingly, it is possible to prevent the reduction in strength of the seat rail 10.

In the work of folding back the sheet material 21a to form the folded edge part 21c, the sheet material 21a can be easily folded back along the core 24. Therefore, the production efficiency of the seat rail 10 can be improved.

Although the embodiment of the present invention has been described above, the present invention is not limited to the above-described embodiment, and the present invention can be modified and changed based on the technical idea thereof.

The invention claimed is:

1. A motorcycle seat rail installed on a vehicle body of a motorcycle, the motorcycle seat rail comprising:

a lateral member located on a lateral side in a width direction of the vehicle body, wherein:

the lateral member has a laminated structure in which a sheet material including one layer made of a fiber reinforced resin or a plurality of layers made of a fiber reinforced resin and laminated to each other is folded back and doubly overlapped; and a folded edge part formed by folding back the sheet material is located at a lower edge part of the lateral member.

2. The motorcycle seat rail according to claim 1, the lateral member comprising:

a first member, wherein:

the first member has a laminated structure in which a sheet material including one layer made of a fiber reinforced resin or a plurality of layers made of a fiber reinforced resin and laminated to each other is folded back and doubly overlapped; and a folded edge part formed by folding back the sheet material is located at a lower edge part of the first member; and a second member, wherein:

the second member has a laminated structure in which a sheet material including one layer made of a fiber reinforced resin or a plurality of layers made of a fiber reinforced resin and laminated to each other is folded back and doubly overlapped; and a folded edge part formed by folding back the sheet material is located at a lower edge part of the second member; and the motorcycle seat rail further comprises:

a coupling member that couples the first member and the second member spaced apart from each other in the width direction of the vehicle body, wherein:

each of the first member and the second member includes a curved region that is curved to be located closer to a center in the width direction of the vehicle body as the first member and the second member progress toward a rear of the vehicle body from a front of the vehicle body;

the lower edge part of each of the first member and the second member includes a front area and a rear area located closer to the rear of the vehicle body with respect to the front area;

the folded edge part of each of the first member and the second member forms the front area of the lower edge part of the each of the first member and the second member;

an inflection area is formed between the front and rear areas of the lower edge part of each of the first member and the second member such that the rear area of the lower edge part of the each of the first member and the second member is located upward from the front of the vehicle body toward the rear of the vehicle body; and when the vehicle body is viewed in the width direction, the inflection area of each of the first member and the second member is disposed in front of a front end of the curved region of the each of the first member and the second member in a front-rear direction of the vehicle body and behind the coupling member.

3. The motorcycle seat rail according to claim 1, wherein:

the lateral member includes a core located inside the folded edge part thereof and extending along the folded edge part; and the sheet material is folded back along the core in the laminated structure of the lateral member.

4. The motorcycle seat rail according to claim 1, wherein:

two fastening portions are provided to fasten the lateral member and a footrest bracket together; and the two fastening portions are spaced apart from each other in a front-rear direction of the vehicle body and are disposed between a front end and a rear end of the folded edge part of the lateral member to be fastened by the fastening portions.

5. The motorcycle seat rail according to claim 1, wherein the lower edge part of the lateral member is a lower end of the lateral member at which the lateral member terminates.

6. A method of manufacturing a motorcycle seat rail including a lateral member located on a lateral side in a width direction of a vehicle body, the method comprising:

a step of preparing a sheet material including one layer made of a fiber reinforced resin or a plurality of layers made of a fiber reinforced resin and laminated to each other;

a step of forming a laminated structure constituting the lateral member in such a manner that the sheet material is folded back and doubly overlapped; and a step of forming an upper flange of the lateral member in such a manner that a facing edge part of the laminated structure facing a folded edge part is bent, the folded edge part being formed by folding back the sheet material and located at a lower edge part of the lateral member.

7. The method of manufacturing the motorcycle seat rail according to claim 6, wherein:

the laminated structure includes a notched edge part that is adjacent to the folded edge part in a longitudinal direction thereof and formed by notching the sheet material; and the folded edge part forms a front area of the lower edge part of the lateral member, and the notched edge part forms a rear area of the lower edge part of the lateral member.

8. The method of manufacturing the motorcycle seat rail according to claim 6, wherein the sheet material is folded back along a core.

9. The method of manufacturing the motorcycle seat rail according to claim 6, wherein the lower edge part of the lateral member is a lower end of the lateral member at which the lateral member terminates.

* * * * *